US012647222B2

(12) United States Patent
Svendsen et al.

(10) Patent No.: US 12,647,222 B2
(45) Date of Patent: Jun. 2, 2026

(54) INTER-BAND CARRIER AGGREGATION WITH INDEPENDENT BEAM MANAGEMENT

(71) Applicant: Nokia Technologies Oy, Espoo (FI)

(72) Inventors: Simon Svendsen, Aalborg (DK); Kim Nielsen, Storvorde (DK); Samantha Caporal Del Barrio, Aalborg (DK); Benny Vejlgaard, Gistrup (DK); Poul Olesen, Støvring (DK); Knud Knudsen, Aabybro (DK); Faranaz Sabouri-Sichani, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 467 days.

(21) Appl. No.: 18/179,304

(22) Filed: Mar. 6, 2023

(65) Prior Publication Data

US 2023/0283417 A1 Sep. 7, 2023

(30) Foreign Application Priority Data

Mar. 7, 2022 (EP) ..................................... 22160554

(51) Int. Cl.
*H04L 5/00* (2006.01)
*H04B 7/06* (2006.01)
(52) U.S. Cl.
CPC ........... *H04L 5/001* (2013.01); *H04B 7/0617* (2013.01)
(58) Field of Classification Search
CPC ..... H04L 5/001; H04L 5/0023; H04B 7/0617; H04B 7/0695; H04B 7/06956; H04B 7/0874; H04B 7/088
See application file for complete search history.

(56) References Cited

U.S. PATENT DOCUMENTS 10,863,582 B2 12/2020 Yu et al.
11,134,473 B2 9/2021 Raghavan et al.
(Continued)

FOREIGN PATENT DOCUMENTS

EP 3681197 A1 7/2020
EP 3703264 A1 9/2020
(Continued)

OTHER PUBLICATIONS

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.3.0, Sep. 2021, pp. 1-187.
(Continued)

*Primary Examiner* — Ricky Q Ngo
*Assistant Examiner* — David M Kayal
(74) *Attorney, Agent, or Firm* — ALSTON & BIRD LLP

(57) ABSTRACT

An apparatus comprising: a switching arrangement configured to split an antenna array panel, comprising an array of antenna elements, to provide a first part for a first downlink beam from a first transmitter and a second part for a second downlink beam from a second transmitter, wherein the first downlink beam and the second downlink beam have independent directions; and the switching arrangement being configured to enable inter-band carrier aggregation at receiver circuitry using a first component carrier received at the first part of the antenna array panel via the first downlink beam and a second component carrier received at the second part of the antenna array panel via the second downlink beam.

20 Claims, 7 Drawing Sheets

(56) References Cited

U.S. PATENT DOCUMENTS

| | | | |
|---|---|---|---|
| 2007/0189419 A1* | 8/2007 | Filipovic ............... | H03M 1/122 |
| | | | 375/334 |
| 2010/0210272 A1* | 8/2010 | Sundstrom ........... | H04B 1/0082 |
| | | | 455/450 |
| 2019/0357249 A1 | 11/2019 | Davydov et al. | |
| 2019/0373563 A1* | 12/2019 | Gong ................... | H04B 17/318 |
| 2021/0045147 A1 | 2/2021 | Zhou et al. | |
| 2021/0068077 A1* | 3/2021 | Raghavan ............ | H04B 7/0404 |
| 2021/0250947 A1 | 8/2021 | Ryu et al. | |
| 2021/0266058 A1 | 8/2021 | Yu et al. | |
| 2022/0167333 A1* | 5/2022 | Raghavan .......... | H04B 7/06952 |
| 2025/0031155 A1* | 1/2025 | Yuan ..................... | H04W 52/42 |

FOREIGN PATENT DOCUMENTS

| | | |
|---|---|---|
| EP | 4017067 A1 | 6/2022 |
| WO | 2021/029077 A1 | 2/2021 |
| WO | 2021/144114 A1 | 7/2021 |

OTHER PUBLICATIONS

"R17 FR2 Inter-band DL CA within same frequency group based on CBM", 3GPP TSG-RAN WG4 Meeting #99-e, R4-2110824, Agenda item: 9.4.2.1.3, OPPO, May 19-27, 2021, 7 pages.

Huang et al., "A Full Field-of-View Self-Steering Beamformer for 5G mm-Wave Fiber-Wireless Mobile Fronthaul", Journal of Lightwave Technology, vol. 38, No. 6, Nov. 29, 2019, pp. 1221-1229.

Extended European Search Report received for corresponding European Patent Application No. 22160554.6, dated Aug. 26, 2022, 15 pages.

"Further discussion on RRM requirements for FR2 inter-band DL CA", 3GPP TSG-RAN4#100-e Meeting, R4-2112426, Agenda Item: 9.4.6.1, Xiaomi, Aug. 16-27, 2021, 4 pages.

Cho et al., "RF Lens-Embedded Antenna Array for mmWave MIMO: Design and Performance", IEEE Communications Magazine, vol. 56, No. 7, Jul. 25, 2018, pp. 42-48.

EP Office Action Mailed on Dec. 4, 2025 for EP Application No. 22160554, 18 page(s).

* cited by examiner

20

22

Key:
24

20

30

40

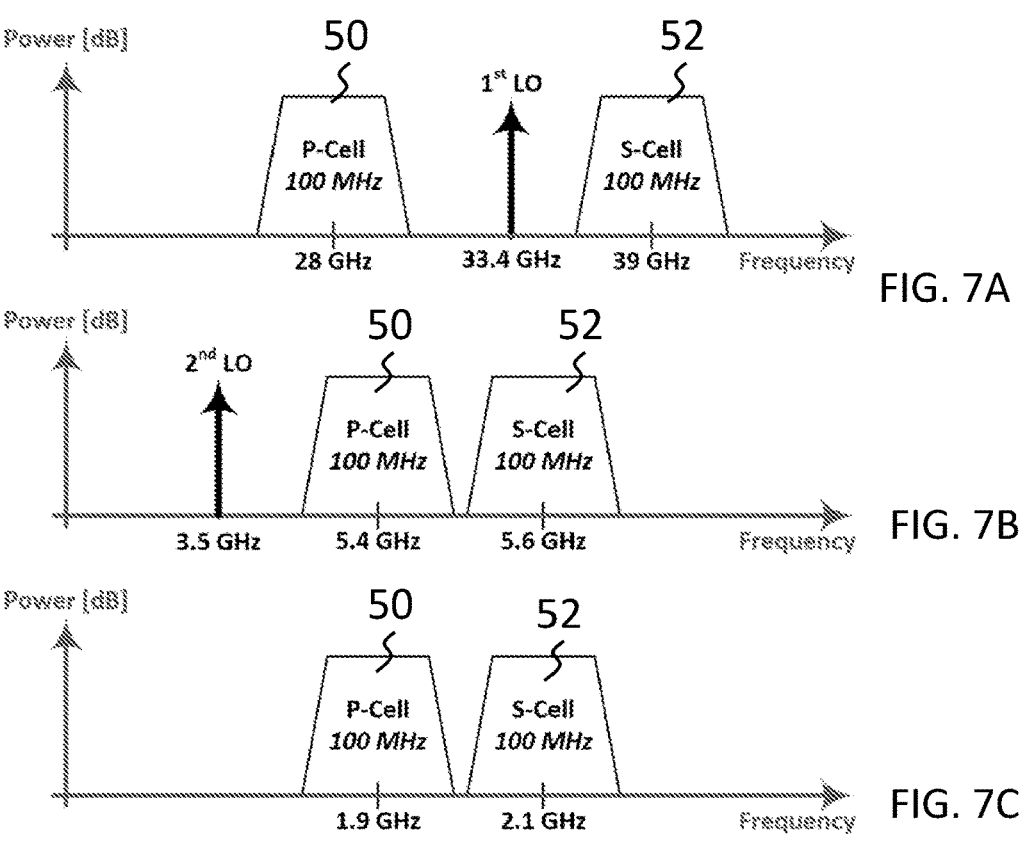
FIG. 7A
FIG. 7B
FIG. 7C
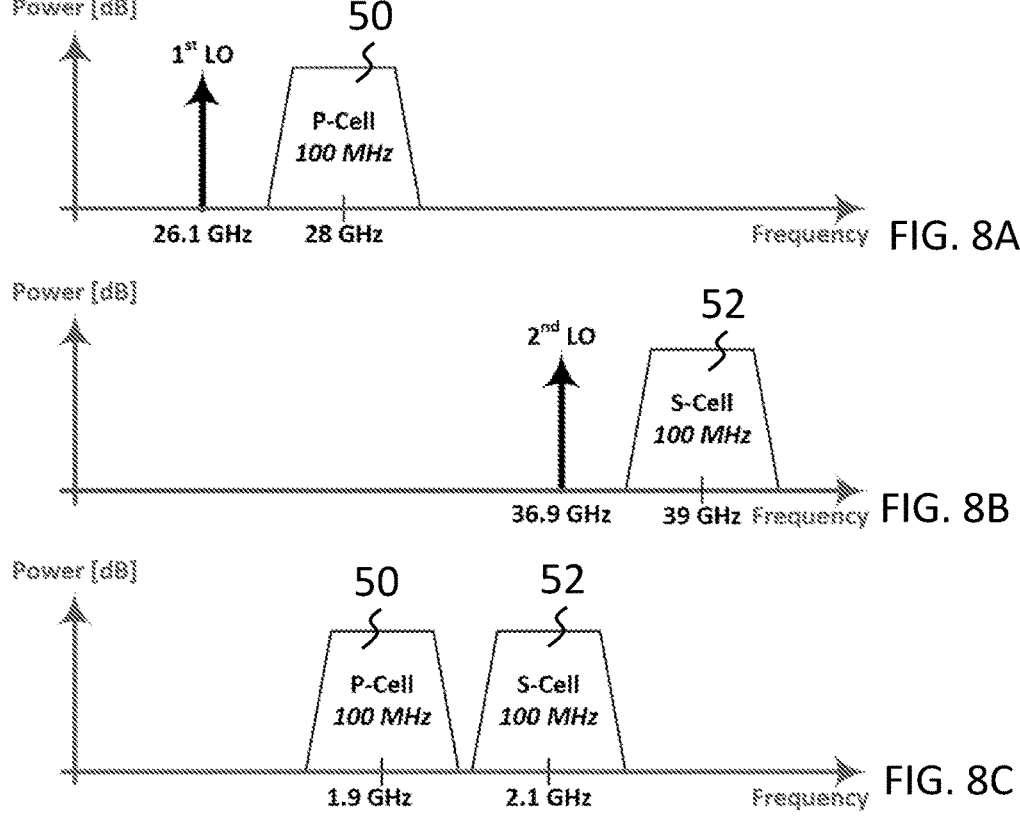
FIG. 8A
FIG. 8B
FIG. 8C

200

202

Split antenna array panel for DL beams to non co-located transmitters

204

Inter-band carrier aggregation using different beams

INTER-BAND CARRIER AGGREGATION WITH INDEPENDENT BEAM MANAGEMENT

RELATED APPLICATION

This application claims priority to the European Patent Application 22160554.6, filed on Mar. 7, 2022, the content of which is incorporated herein by reference in its entirety.

TECHNOLOGICAL FIELD

Embodiments of the present disclosure relate to radio frequency and antenna system management for inter-band carrier aggregation with independent beam management.

BACKGROUND

Carrier aggregation (CA) involves the aggregation of two or more component carriers in order to support wider communication bandwidths. Downlink Carrier aggregation (DL-CA) involves the aggregation of two or more downlink (DL) component carriers in order to support wider downlink bandwidths.

In intra-band carrier aggregation, the two or more component carriers are in the same communication band. In inter-band carrier aggregation, the two or more component carriers are in different communication bands. The communication bands are typically defined by a telecommunication standard.

It is possible for the one DL component carrier to be transmitted from one transmission point (TRP) and for a different DL component carrier to be transmitted from another transmission point (TRP). Those transmission points can be co-located or not co-located. If co-located the direction of arrival of the component carriers at a user equipment (UE) may be the same. If not co-located the direction of arrival of the component carriers at the user equipment will be different.

An antenna array panel comprises multiple antenna elements. The antenna array can be used for beamforming in transmission and/or reception by applying different amplitude and phase weightings to different antenna elements. A user equipment can perform common beam management where it selects a DL reception beam based on a beam management reference signal (BMRS) measured for a primary cell that uses the primary component carrier. A user equipment can perform independent beam management where it selects a DL reception beam for a component carrier based on BMRS measured for the cell that uses that component carrier.

It would be desirable to enable non-co-located inter-band carrier aggregation with independent beam management with less hardware costs.

BRIEF SUMMARY

According to various, but not necessarily all, embodiments there is provided an apparatus comprising means for:
splitting an antenna array panel, comprising an array of antenna elements, to provide at least a first part for a first downlink beam from a first transmitter and a second part for a second downlink beam from a second transmitter, wherein the first downlink beam and the second downlink beam have independent directions; and enabling inter-band carrier aggregation at receiver circuitry using a first component carrier received at the first part of the antenna array panel via the first downlink beam and a second component carrier received at the second part of the antenna array panel via the second downlink beam.

In some but not necessarily all examples, the apparatus comprises means for independent beam-steering of the first downlink beam and the second downlink beam.

In some but not necessarily all examples, the apparatus comprises means for dynamically adjusting a first number of antenna elements in the first part of the antenna array panel and a second number of antenna elements in the second part of the antenna array panel.

In some but not necessarily all examples, the apparatus is configured to determine the first number of antenna elements and the second number of antenna elements in dependence on measurements.

In some but not necessarily all examples, the apparatus is configured to determine the first number of antenna elements and the second number of antenna elements in dependence on measured pathloss.

In some but not necessarily all examples, the apparatus is configured to measure pathloss based on a Beam Measurement Reference Signal.

In some but not necessarily all examples, at least some antenna elements of the array are selectable to be in the first part or in the second part of the antenna array panel.

In some but not necessarily all examples, the receiver circuitry comprises common circuitry that is common for the first component carrier and the second component carrier, wherein the common circuitry comprises analog to digital conversion circuitry that is common for the first component carrier and the second component carrier.

In some but not necessarily all examples, the first component carrier occupies a first frequency band and the second component carrier occupies a second frequency band, different to the first frequency band, the apparatus comprising means for:
down converting the first component carrier to a third frequency band;
down converting the second component carrier to a fourth frequency band;
processing the first component carrier occupying the third frequency band and the second component carrier occupying the fourth frequency band at the receiver circuitry, wherein the receiver circuitry is configured to process the third and fourth frequency bands.

In some but not necessarily all examples, the apparatus is configured to down convert the first component carrier to the third frequency band and separately down convert the second component carrier to the fourth frequency band configured to simultaneously down convert the first component carrier to a first intermediate frequency band and the second component carrier to a second intermediate frequency band, and simultaneously down convert the first component carrier from the first intermediate frequency band to the third frequency band and the second component carrier from the second intermediate frequency band to the fourth frequency band.

In some but not necessarily all examples, the third band and the fourth band are contiguous.

In some but not necessarily all examples, the apparatus is configured to provide a first physical downlink path to the receiver circuitry for an antenna element when the antenna element is operating in the first part and configured to provide a second physical downlink path to the receiver circuitry for the antenna element when the antenna element is operating in the second part, wherein the first physical path and the second physical path comprise differences.

In some but not necessarily all examples, the first physical downlink path and the second physical downlink path are frequency selective, the first physical downlink path being configured for the first frequency band but not the second frequency band and the second physical downlink path being configured for the second frequency band but not the first frequency band.

In some but not necessarily all examples, the apparatus comprises a switching arrangement configured to switch between the first physical downlink path and the second physical downlink path.

In some but not necessarily all examples, at least one antenna element has a single feed and the switching arrangement is configured to couple the feed to the receiver circuitry via a selected one of the first physical downlink path and the second physical downlink path In some but not necessarily all examples, at least one antenna element has a dual feed and the switching arrangement is configured to couple a selected one of the dual feeds to the receiver circuitry.

In some but not necessarily all examples, the apparatus is configured to switch between using the antenna array panel is a split configuration comprising the first part for a first beam direction and the second part for a second beam direction and an unsplit configuration for a single beam direction.

In some but not necessarily all examples, the apparatus is configured to control the first frequency band of the first component carrier;

the number of antenna elements in the first part;

the first direction of the first downlink beam at reception the second frequency band of the second component carrier;

the number of antenna elements in the second part;

the second direction of the first downlink beam

In some but not necessarily all examples, the apparatus is configured as user equipment or a mobile cellular terminal.

According to various, but not necessarily all, embodiments there is provided a method comprising:

splitting an antenna array panel, comprising an array of antenna elements, to provide a first part for a first downlink beam from a first transmitter and a second part for a second downlink beam from a second transmitter, wherein the first downlink beam and the second downlink beam have independent directions;

enabling inter-band carrier aggregation at a receiver using a first component carrier received at the first part of the antenna array panel via the first downlink beam and a second component carrier received at the second part of the antenna array panel via the second downlink beam.

According to various, but not necessarily all, embodiments there is provided an apparatus comprising:

receiver circuitry and means for:

splitting an antenna array panel, comprising an array of antenna elements, to provide at least a first part configured to receive a first downlink beam from a first transmitter and a second part configured to receive a second downlink beam from a second transmitter, wherein the first downlink beam and the second downlink beam have independent directions; and enabling inter-band carrier aggregation at the receiver circuitry using a first component carrier received at the first part of the antenna array panel via the first downlink beam and a second component carrier received at the second part of the antenna array panel via the second downlink beam.

According to various, but not necessarily all, embodiments there is provided a method comprising:

splitting an antenna array panel, comprising an array of antenna elements, to provide a first part configured to receive a first downlink beam from a first transmitter and a second part configured to receive a second downlink beam from a second transmitter, wherein the first downlink beam and the second downlink beam have independent directions;

enabling inter-band carrier aggregation at a receiver using a first component carrier received at the first part of the antenna array panel via the first downlink beam and a second component carrier received at the second part of the antenna array panel via the second downlink beam.

According to various, but not necessarily all, embodiments there is provided examples as claimed in the appended claims.

BRIEF DESCRIPTION

Some examples will now be described with reference to the accompanying drawings in which:

FIGS. 7A, 7B, 7C show another example of the subject matter described herein;

FIGS. 8A, 8B, 8C show another example of the subject matter described herein;

DETAILED DESCRIPTION

Figure 1:
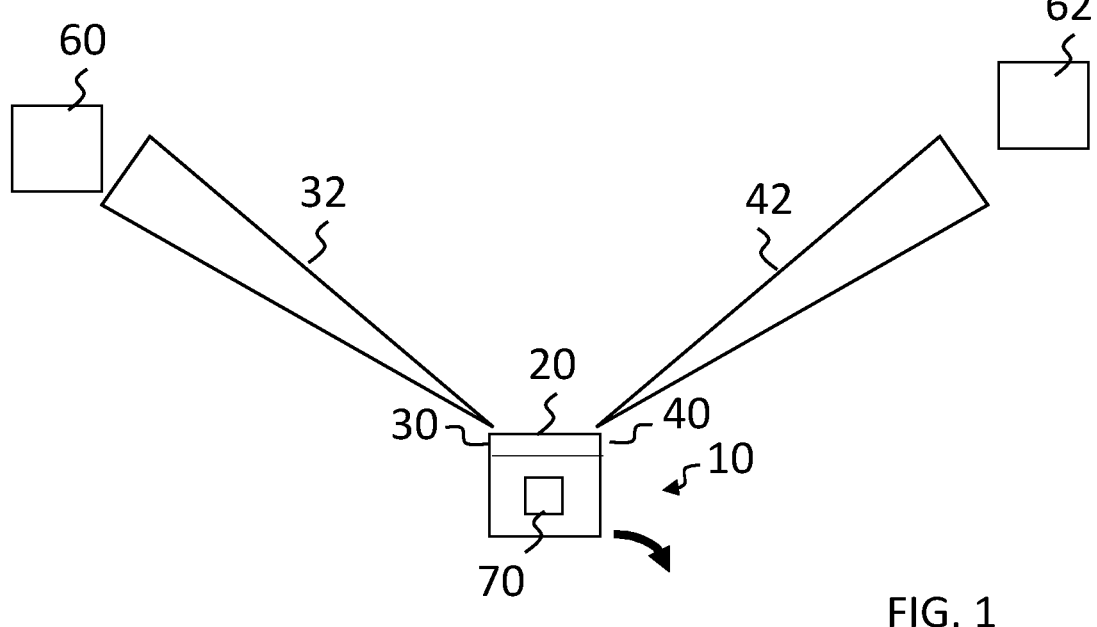
FIG. 1 shows an example of the subject matter described herein.

FIG. 1 illustrates an example of an apparatus 10 comprising means for:

splitting an antenna array panel 20 to provide a first part 30 for a first downlink beam 32 from a first transmitter 60 and a second part 40 for a second downlink beam 42 from a second transmitter 62. The apparatus 10 also comprises means for enabling inter-band carrier aggregation 80 at receiver circuitry 70.

Figure 2:
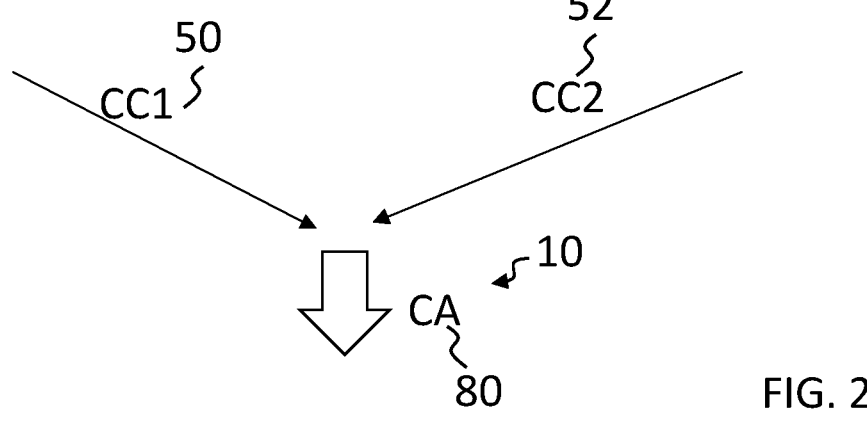
FIG. 2 shows another example of the subject matter described herein.

FIG. 2 illustrates inter-band carrier aggregation 80 at receiver circuitry 70. The inter-band carrier aggregation uses a first component carrier 50 received at the first part of the antenna array panel 20 via the first downlink beam 32 and a second component carrier 52 received at the second part 40 of the antenna array panel 20 via the second downlink beam 42.

In this example, the first downlink beam 32 and the second downlink beam 42 have independent directions. In this example, the first downlink beam 32 and the second downlink beam 42 have different directions.

Figure 3:
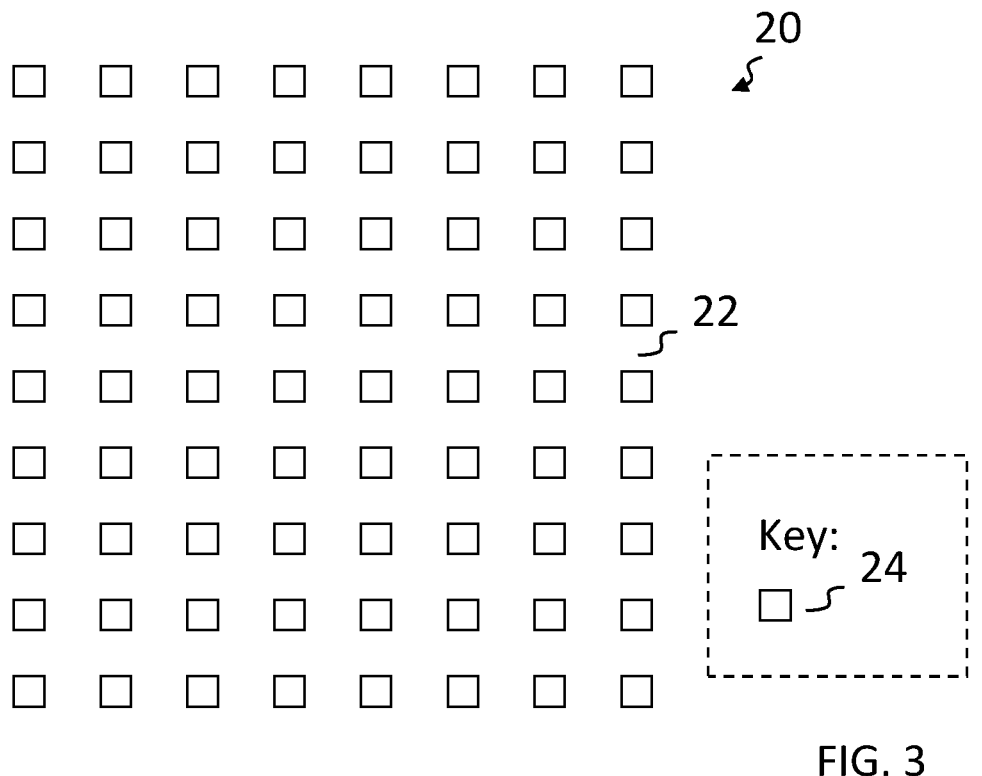
FIG. 3 shows another example of the subject matter described herein.
Figure 4:
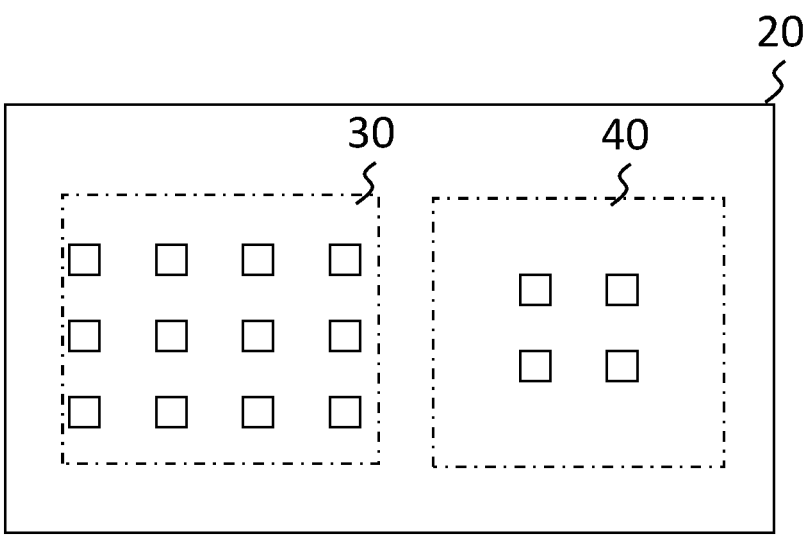
FIG. 4 shows another example of the subject matter described herein.

An example of an antenna array panel 20 is illustrated in FIG. 3. The antenna array panel 20 comprises an array 22 of antenna elements 24. The splitting of the antenna array panel 20 is illustrated in FIG. 4.

An antenna array panel 20 is one hardware component with an n×m array 22 of antenna elements 24 that may operate at two frequency bands or more.

It will therefore be appreciated that the apparatus 10 comprises means for:

splitting an antenna array panel 20, comprising an array 22 of antenna elements 24, to provide a first part 30 for a first downlink beam 32 from a first transmitter 60 and a second part 40 for a second downlink beam 42 from a second transmitter 62, wherein the first downlink beam 32 and the second downlink beam 42 have independent directions; and enabling inter-band carrier aggregation 80 at receiver circuitry 70 using a first component carrier 50 received at the first part 30 of the antenna array panel 20 via the first downlink beam 32 and a second component carrier 52 received at the second part 40 of the antenna array panel 20 via the second downlink beam 42.

The independent directions can, in at least some examples, be different directions.

In at least some examples, the apparatus 10 is configured to dynamically adjust a first number of antenna elements 24 in the first part 30 of the antenna array panel 20 and a second number of antenna elements 24 in the second part 40 of the antenna array panel 20. In some examples, the apparatus 10 is, configured to determine the first number of antenna elements 24 in the first part 30 and the second number of antenna elements 24 in the second part 40 in dependence on measurements, for example a pathloss measurement.

For example, if there is increasing pathloss associated with the first downlink beam 32 provided by the first part 30 of the antenna array panel 20, then the number of antenna elements 24 used for the first part 30 of the antenna array panel 20 is increased. For example, if there is decreasing pathloss associated with the first downlink beam 32 provided by the first part 30 of the antenna array panel 20, then the number of antenna elements 24 used for the first part 30 of the antenna array panel 20 is decreased.

For example, if there is increasing pathloss associated with the second downlink beam 42 provided by the second part 40 of the antenna array panel 20, then the number of antenna elements 24 used for the second part 40 of the antenna array panel 20 is increased. For example, if there is decreasing pathloss associated with the second downlink beam 42 provided by the second part 40 of the antenna array panel 20, then the number of antenna elements 24 used for the second part 40 of the antenna array panel 20 is decreased.

The pathloss measured can be a radio frequency pathloss. For example, the pathloss associated with a downlink beam 32, 42 can be determined by measuring a Beam Measurement Reference Signal. For example, reference signal received power (RSRP) based on Channel State Information Reference Signal (CSI-RS) or based on Synchronization Signal Block Beam (SSB).

Some or all of the antenna elements 24 in the array 22 forming the antenna array panel 20 can be controlled to be in the first part 30 or the second part 40 of the antenna array panel 20. The apparatus 10 is configured to dynamically select which of the antenna elements 24 of the array 22 are in the first part 30 and which are in the second part 40. An antenna element 24 that is in the first part 30 providing the first downlink beam 32 can be switched to being in the second part 40 providing the second downlink beam 42. An antenna element 24 that is in the second part 40 providing the second downlink beam 42 can be switched to being in the first part 30 providing the first downlink beam 32.

The apparatus 10 is configured to independently control beam-steering of the first downlink beam 32 using the first part 30 and to independently control beam-steering of the second downlink beam 42 using the second part 40.

The beam-steering direction of the first downlink beam 32 can be controlled by adjusting the relative phase difference and relative amplitude difference between the antenna elements 24 of the first part 30. The relative phase differences and relative amplitude differences can be applied in the digital domain and/or in the analog domain.

The beam-steering direction of the second downlink beam 42 can be controlled by adjusting the relative phase difference and relative amplitude difference between the antenna elements 24 of the second part 40. The relative phase differences and relative amplitude differences can be applied in the digital domain and/or in the analog domain.

Therefore, as the apparatus 10 moves relative to the first transmitter 60 and the second transmitter 62, the first downlink beam 32 can be independently beam-steered to remain directed towards the first transmitter 60 and the second downlink beam 42 can be independently beam-steered to remain directed towards the second transmitter 62.

Figure 5:
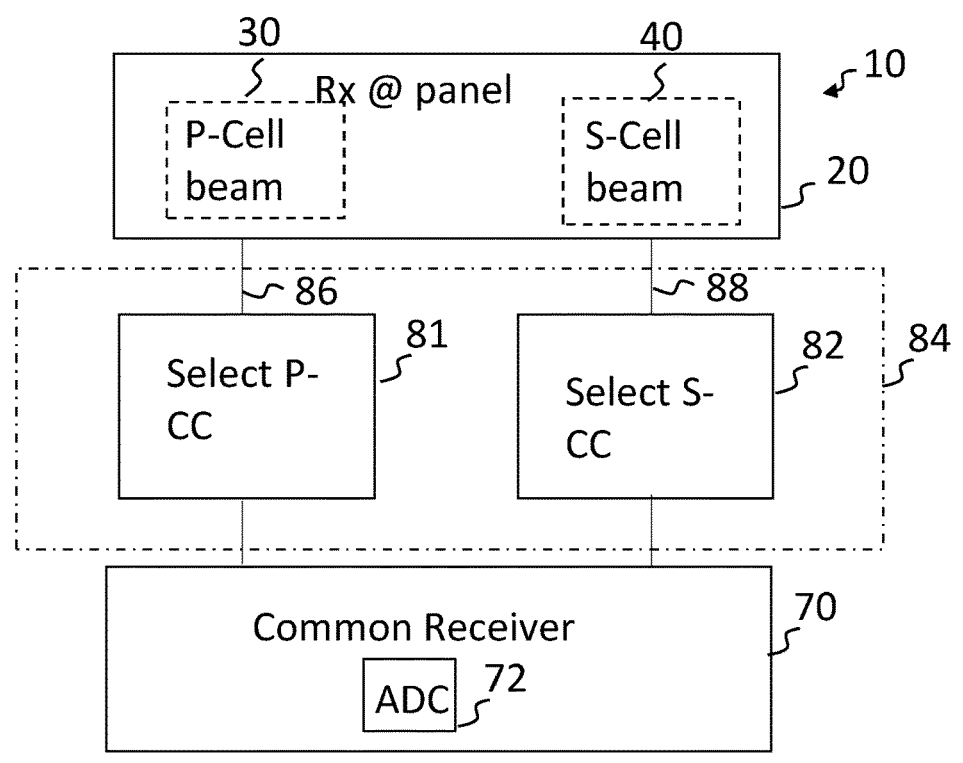
FIG. 5 shows another example of the subject matter described herein.

Referring to FIG. 5, the antenna array panel 20 comprises a first part 30 for providing the first downlink beam 32 for the first component carrier 50 from a first transmitter 60 and a second part 40 for providing the second downlink beam 42 for the second component carrier 52 from a second transmitter 62. The apparatus 10 comprises receiver circuitry 70 that is common to the first part 30 and the second part 40 and is used for inter-band carrier aggregation 80. The inter-band carrier aggregation 80 uses the first component carrier 50 received at the first part 30 of the antenna array panel 20 via the first downlink beam 32 and the second component carrier 52 received at the second part 40 of the antenna array panel 20 via the second downlink beam 42.

In this example the receiver circuitry 70 comprises analog to digital conversion circuitry 72 that is common for the first component carrier 50 and the second component carrier 52.

In this example, the first component carrier 50 is the component carrier of the primary cell (P-Cell) served by the first transmitter 60 and the second component carrier 52 is the component carrier of the secondary cell (S-Cell) served by the second transmitter 62. The first downlink beam 32 is the P-Cell beam and the second downlink beam 42 is the S-Cell beam.

The apparatus 10 is configured by the switching arrangement 84 to provide, for each antenna element 24, a first physical downlink path 86 via first switching means 81 to the receiver circuitry 70 for the antenna element 24 when the antenna element 24 is operating in the first part 30 and a second different physical downlink path 88 via second switching means 82 to the receiver circuitry 70 for the antenna element 24 when the antenna element 24 is operating in the second part 40. Thus, the route from an antenna element 24 to the receiver circuitry 70 is different depending upon whether the antenna element 24 is within the first part 30 or within the second part 40.

The first physical downlink path 86 and the second physical downlink path 88 comprise differences between them. In at least some examples, the first physical downlink path 86 and the second physical downlink path 88 are frequency selective. For example, the first physical downlink path 86 is configured for use by a first frequency band associated with the first component carrier 50 but not for use by a second frequency band associated with the second component carrier 52, and the second physical downlink path 88 is configured for use by the second frequency band but not for use by the first frequency band. For example, the first physical downlink path 86 can have a low impedance for the first frequency band and a high impedance for the second frequency band.

In at least some examples, the apparatus 10 comprises a switching arrangement 84 configured to switch each antenna element 24 between a first physical downlink path 86 for the first component carrier 50 and a second physical downlink path 88 for the second component carrier 52.

The first physical downlink paths 86 from the antenna elements 24 of the first part 30 carry the first component carrier 50 received via the first downlink beam 32. The second physical downlink paths 88 from the antenna elements 24 of the second part carry the second component carrier 52 received via the second downlink beam 42.

Figure 6:
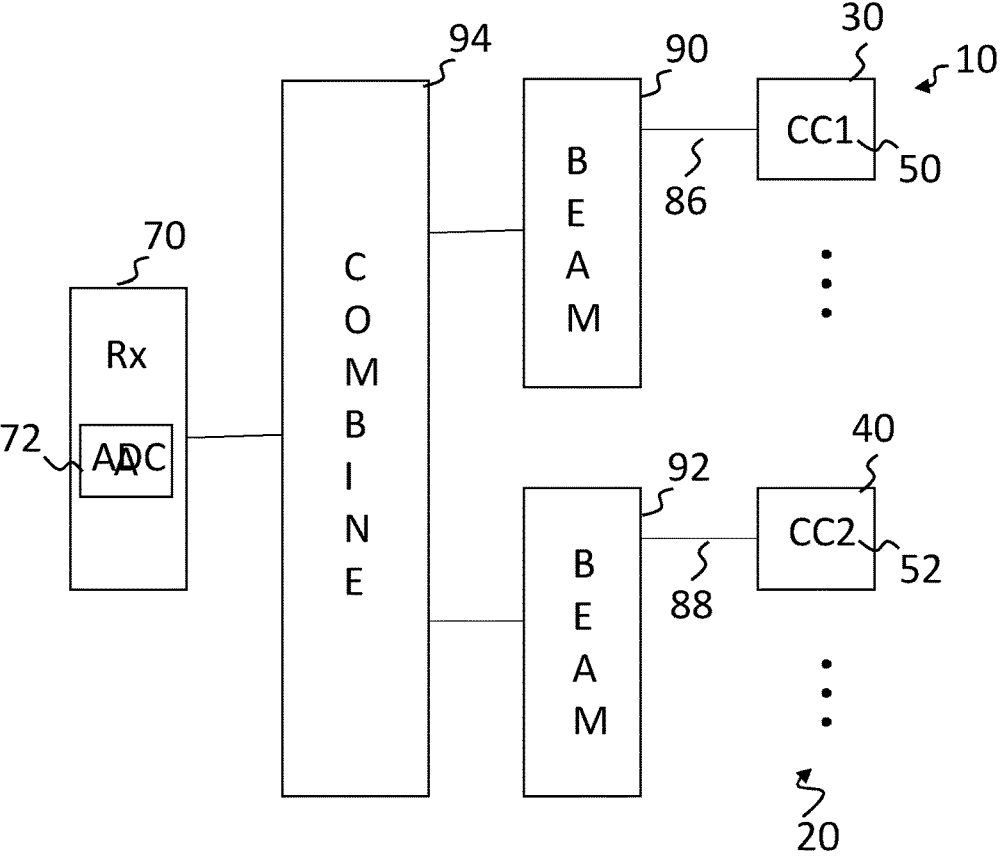
FIG. 6 shows another example of the subject matter described herein.

FIG. 6 illustrates processing of the first component carrier 50 to perform beam-configuration 90 in the analog domain for the phase and amplitude weights used for beam-forming to form the first downlink beam 32 and illustrates processing of the second component carrier 52 to perform beam-configuration 92 in the analog domain for the phase and amplitude weights used for beam-forming to form the second downlink beam 42.

Whether or not beam-configuration is performed in the analog domain and/or the digital domain, in at least some examples the first component carrier 50 and the second component carrier 52 are combined at combination circuitry 94 to occupy a frequency and bandwidth suitable for the receiver 70.

FIG. 7A, 7B, 7C and FIG. 8A, 8B, 8C illustrate examples of down-conversion processing that could be performed by the combination circuitry 94. In these examples, the first component carrier 50 occupies a first frequency band (28 GHz) and the second component carrier 52 occupies a second frequency band (39 GHz), different to the first frequency band.

The combination circuitry 94 is configured to down convert the first component carrier 50 from the first frequency band (28 GHz) to a third frequency band (1.9 GHz) and is configured to down convert the second component carrier 52 from the second frequency band (39 GHz) to a fourth frequency band (2.1 GHz).

The receiver circuitry 70 is configured to process simultaneously the third and fourth frequency bands (1.9-2.1 GHz) and processes simultaneously the first component carrier 50 occupying the third frequency band (1.9 GHz) and the second component carrier 52 occupying the fourth frequency band (2.1 GHz).

Referring to FIGS. 8A, 8B, 8C the combination circuitry 94 is configured to down convert the first component carrier 50 from the first frequency band (28 GHz) to the third frequency band (1.9 GHz), as illustrated in FIGS. 8A and 8C, and is configured to separately down convert the second component carrier 52 from the second frequency band (39 GHz) to the fourth frequency band (2.1 GHz), as illustrated in FIGS. 8B and 8C.

In FIG. 8A, the first component carrier 50 from the first frequency band (28 GHz) is mixed with a local oscillator (LO) frequency of 26.1 GHz and low-pass filtered to obtain the lower combination frequency (1.9 GHz) as the third frequency band.

In FIG. 8B, the second component carrier 52 from the second frequency band (39 GHz) is mixed with a local oscillator (LO) frequency of 36.9 GHz and low-pass filtered to obtain the lower combination frequency (2.1 GHz) as the fourth frequency band.

Referring to FIGS. 7A, 7B, 7C the combination circuitry 94 is configured to simultaneously down convert the first component carrier 50 from the first frequency band (28 GHz) to a first intermediate frequency band (5.4 GHz) and the second component carrier 52 from the second frequency band (39 GHz) to a second intermediate frequency band (5.6 GHz) and is configured to simultaneously down convert the first component carrier 50 from the first intermediate frequency band (5.4 GHz) to the third frequency band (1.9 GHz) and the second component carrier 52 from the second intermediate frequency band (5.6 GHz) to the fourth frequency band (2.1 GHz).

In FIG. 7A, the first component carrier 50 from the first frequency band (28 GHz) and the second component carrier 52 from the second frequency band (39 GHz) are simultaneously mixed with a local oscillator (LO) frequency of 33.4 GHz and low-pass filtered to obtain the lower combination frequency (5.4 GHz) as the first intermediate frequency band (for the first component carrier 50) and the lower combination frequency (5.6 GHz) as the second intermediate frequency band (for the second component carrier 52).

In FIG. 7B, the first component carrier 50 from the first intermediate frequency band (5.4 GHz) and the second component carrier 52 from the second intermediate frequency band (5.6 GHz) are simultaneously mixed with a local oscillator (LO) frequency of 3.5 GHz and low-pass filtered to obtain the lower combination frequency (1.9 GHz) as the third frequency band (for the first component carrier 50) and the lower combination frequency (2.1 GHz) as the fourth frequency band (for the second component carrier 52).

In the examples of FIGS. 7A-7C and 8A-8C, the third frequency band and the fourth band are contiguous within a single frequency band of operation of the receiver 70.

FIGS. 9A to 9D illustrate different examples of switching arrangements 84.

A switching arrangement 84 is configured to switch each antenna element 24 between a first physical downlink path 86 and a second physical downlink path 88.

The first physical downlink paths 86 from the antenna elements 24 of the first part 30 carry the first component carrier 50 received via the first downlink beam 32. The second physical downlink paths 88 from the antenna elements 24 of the second part carry the second component carrier 52 received via the second downlink beam 42.

The switching arrangement 84, the first physical downlink path 86 and the second physical downlink path 88 are labelled for one polarization (CoPol) and not for the other orthogonal polarization (Cross Pol). The term 'CoPol' refers to co-polarization and is used for both downlink and uplink in this example. The term 'Cross Pol' refers to cross-polarization and indicates that this polarization is orthogonal to the co-polarization and is only used for downlink in this example (implementation with uplink at both the co- and cross-polarization being possible). It should be appreciated that both of the polarization reception chains comprise a switching arrangement for selecting a first physical downlink path and/or a second physical downlink path. Although in these examples, the transmit chain is associated with the CoPol chain, in other examples it can additionally or alternatively be associated with the CrossPol chain.

Figure 9A:
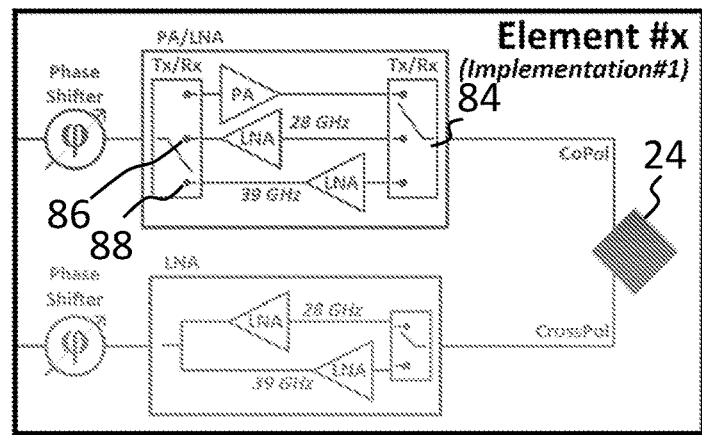
FIGS. 9A, 9B, 9C, 9D show various examples of the subject matter described herein.
Figure 9B:
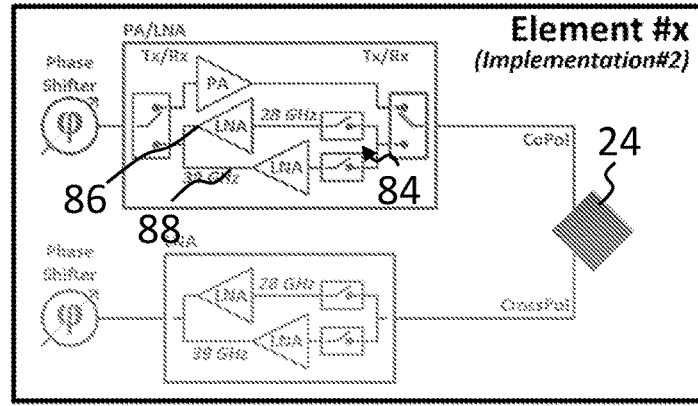

In FIGS. 9A and 9B the antenna element 24 is a single-feed antenna element. The switching arrangement 84 is configured to couple the feed to the receiver circuitry 70 via a selected one of the first physical downlink path 86 and the second physical downlink path 88.

In FIG. 9A the switching arrangement 84 is configured to couple the feed to the receiver circuitry 70 via one of the first physical downlink path 86 and the second physical downlink path 88.

In FIG. 9B the switching arrangement 84 is configured to couple the feed to the receiver circuitry 70 via one or both of the first physical downlink path 86 and the second physical downlink path 88.

The switching arrangement 84 is configured to provide a first physical downlink path 86 to the receiver circuitry 70 for an antenna element 24 when the antenna element 24 is operating in the first part 30 and configured to provide a second different physical downlink path 88 to the receiver circuitry 70 for the antenna element 24 when the antenna element 24 is operating in the second part 40. In this example but not necessarily all examples, the first physical downlink path 86 and the second physical downlink path 88 are frequency selective, the first physical downlink path being configured for the first frequency band but not the second frequency band and the second physical downlink path being configured for the second frequency band but not the first frequency band.

Figure 9C:
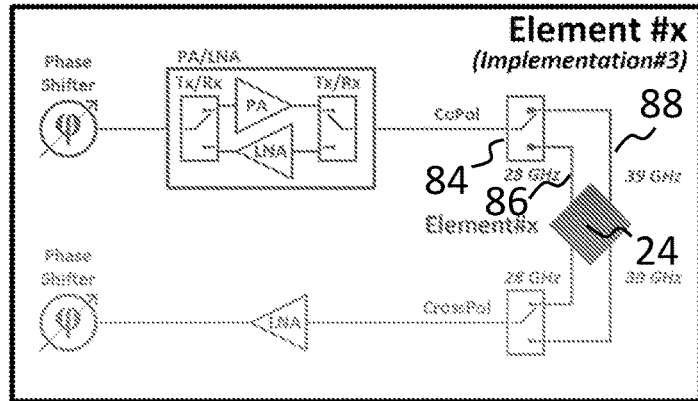
Figure 9D:
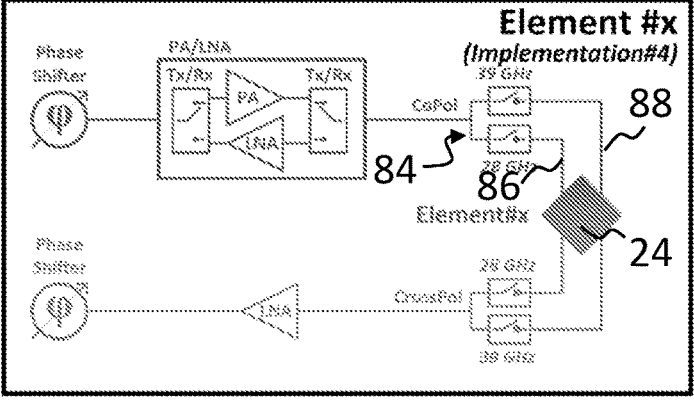

In FIGS. 9C and 9D the antenna element 24 is a dual-feed antenna element. The switching arrangement 84 is configured to couple a selected one of the dual feeds to the receiver circuitry 70.

A dual-feed is for two individual feeds to/from the antenna for two individual and distinct frequency bands.

In FIG. 9C the switching arrangement 84 is configured to couple the receiver circuitry 70 to a first feed via the first physical downlink path 86 or to the second feed via the second physical downlink path 88.

In FIG. 9D the switching arrangement 84 is configured to couple the receiver circuitry 70 to a first feed via the first physical downlink path 86 and/or to the second feed via the second physical downlink path 88.

The switching arrangement 84 is configured to provide a first physical downlink path 86 to the receiver circuitry 70 for a first feed of the antenna element 24 when the antenna element 24 is operating in the first part 30 and configured to provide a second different physical downlink path 88 to the receiver circuitry 70 for a second feed of the antenna element 24 when the antenna element 24 is operating in the second part 40. The first physical downlink path 86 and the second physical downlink path 88 can be frequency selective, in which case the first physical downlink path is configured for the first frequency band but not the second frequency band and the second physical downlink path is configured for the second frequency band but not the first frequency band.

The switching arrangement 84, the first physical downlink path 86 and the second physical downlink path 88 are labelled for one polarization (CoPol) and not for the other orthogonal polarization (Cross Pol). However, it should be appreciated that both of the polarization reception chains comprise a switching arrangement for selecting a first physical downlink path and/or a second physical downlink path. Although in these examples, the transmit chain is associated with the CoPol chain, in other examples it can additionally or alternatively be associated with the CrossPol chain.

In the above-described examples, it has been assumed that the first transmitter 60 and the second transmitter 62 have spatial diversity that is they are not co-located. The direction of the first downlink beam 32 at the apparatus 10 is therefore different to the direction of the second downlink beam 42 at the apparatus 10.

In some examples, the first transmitter 60 and the second transmitter 62 can be co-located such that the first downlink beam 32 and the second downlink beam 42 have the same (or substantially the same) direction at the apparatus 10. In at least some of these examples, the antenna array panel 20 is no longer split into a first part 30 and a second part 40 as independent beam-forming is no longer performed. Therefore, when the first transmitter 60 and the second transmitter 62 are co-located the full antenna array panel 20 can be used for both component carrier 50, 52. For example, the architectures illustrated in FIGS. 9B & 9D allow dual resonance simultaneous reception.

The apparatus 10 can therefore be configured to switch between using the antenna array panel 20 in a split configuration comprising the first part 30 for a first beam direction and the second part 40 for a second different beam direction and an unsplit configuration for a single beam direction.

In at least some examples, in order to control reception of the first component carrier 50, the apparatus 10 is configured to control the number of antenna elements 24 used in a first part 30 of a split antenna array panel 20, control a direction of a first downlink beam 32 formed by the first part 30 of the split antenna array panel 20, and, optionally, control the first frequency band used at the apparatus 10 for the first component carrier 50.

In at least some examples, in order to control reception of the second component carrier 52, the apparatus 10 is configured to control the number of antenna elements 24 used in a second part 40 of a split antenna array panel 20, control a direction of a second down link beam 42 formed by the second part 40 of the split antenna array panel 20, and, optionally, control the second frequency band used at the apparatus for the second component carrier 52.

Figure 10:
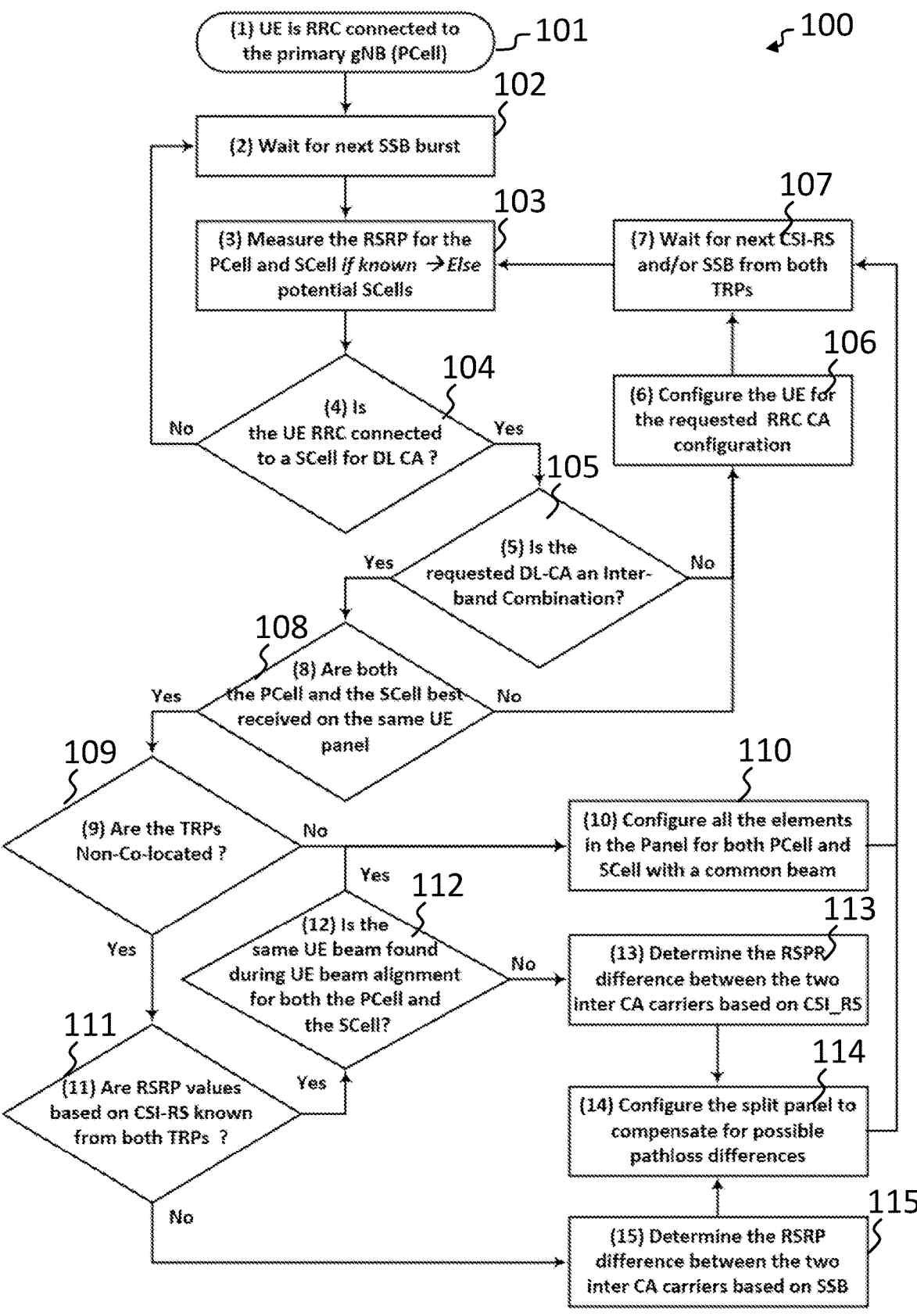
FIG. 10 shows another example of the subject matter described herein.

Referring to FIG. 10, when there is downlink inter band carrier aggregation using a single antenna array panel 20 for producing independently managed beams to non co-located transmitters, the method 100 at block 114 comprises:

splitting an antenna array panel 20, comprising an array 22 of antenna elements 24, to provide a first part 30 for a first downlink beam 32 from a first transmitter 60 and a second part 40 for a second downlink beam 42 from a second transmitter 62, wherein the first downlink beam 32 and the second downlink beam 42 have independent directions; and enabling inter-band carrier aggregation at receiver circuitry 70 using a first component carrier 50 received at the first part 30 of the antenna array panel 20 via the first downlink beam 32 and a second component carrier 52 received at the second part 40 of the antenna array panel 20 via the second downlink beam 42.

In at least some examples, the independent directions are different directions.

In the above-described examples, the apparatus 10 can be a mobile terminal in a radio communications network. For example, the apparatus 10 can be user equipment (UE) in a third-generation partnership project (3GPP) network and the first transmitter (TRP) 60 can be a base station e.g. gNB in a primary cell (PCell) and the second transmitter (TRP) 62 can be a base station e.g. gNB in a secondary cell (SCell).

The UE 10 is in a radio resource control (RRC) connected mode. The major functions of the RRC protocol include connection establishment and release functions, broadcast of system information, radio bearer establishment, reconfiguration and release, RRC connection mobility procedures, paging notification and release and outer loop power control.

Each cell has one or multiple Synchronization Signal Block (SSB) beams, which form a grid of beams covering the whole cell area. The UE 10 searches for and measures the beams, maintaining a set of candidate beams. The measurement of an SSB can use reference signal received power (RSRP).

Channel State Information Reference Signal (CSI-RS) is a reference signal (RS) that is used in the Downlink (DL) direction for the purpose of Channel Sounding and used to measure the characteristics of a radio channel so that it can use correct modulation, code rate, beam forming etc. SSB beams are cell (not UE) specific reference signals whereas CSI-RS is a UE specific reference signal.

Referring to FIG. 10, at block 101, the UE 10 is RRC connected to the primary gNB 60 (PCell).

At block 102, the UE 10 waits for the next SSB burst.

At block 103, the UE 10 measures the RSRP for the PCell and, if there is an SCell the RSRP for the SCell (otherwise the RSRP for the potential SCells).

At block 104, the UE is RRC connected to a SCell for downlink (DL) carrier aggregation (CA).

At block 105, it is determined if the DL CA is an inter-band combination. If yes, the method 100 proceeds to block 108. If no, the method proceeds to block 106.

At block 106, the UE 10 configures for the requested RRC CA configuration, then at block 107, the UE 10 waits for the next CSI-RS and/or SSB from the first and second transmitters 60, 62.

At block 108, the UE 10 determines whether or not the PCell first component carrier 50 and the SCell second component carrier 52 are best received on the same UE panel 20. If yes, the method 100 proceeds to block 109. If no the method 100 proceeds to block 106.

At block 109, the UE 10 determines whether or not the first transmitter 60 and the second transmitter 62 are not co-located. If the first and second transmitters 60, 62 are co-located then the method 100 proceeds to block 110. If the first and second transmitters 60, 62 are not co-located then the method 100 proceeds to block 111.

At block 111, the UE determines whether or not the RSRP values based on CSI-RS are known from both the first transmitter 60 and the second transmitter 62. If yes, the method 100 proceeds to block 112. If no, the method 100 proceeds to block 115.

At block 115, the UE determines the RSRP difference between the two inter CA carriers based on SSB. Then at block 114 the UE configures the split panel 20 to compensate for possible pathloss differences by adjusting the number of antenna elements 24 in the first part 30 and in the second part 40. The UE 10 performs carrier aggregation. After block 114 the method 100 proceeds to block 107.

At block 112 the UE 10 determines whether or not the same UE beam is found during beam alignment for both the PCell and SCell. If yes, the first transmitter 60 and the second transmitter 62 are covered by the same UE beam and the method 100 moves to block 110. If no, the first transmitter 60 and the second transmitter 62 are not covered by the same UE beam and the method 100 moves to block 113.

At block 113, the UE determines the RSRP difference between the two inter CA carriers based on CSI-RS. Then at block 114 the UE configures the split panel 20 to compensate for possible pathloss differences by adjusting the number of antenna elements 24 in the first part 30 and in the second part 40. The UE 10 performs carrier aggregation. After block 114 the method 100 proceeds to block 107.

At block 110, the UE configures the elements 24 in the panel 20 for both PCell and SCell with a common beam. The method 100 then proceeds to block 107.

The method 100 therefore enables a common receiver circuitry 70 and a common antenna array panel 20 to be used for inter-band carrier aggregation 80 based on independent downlink beams 32, 42 to multiple non co-located transmitters 60, 62 by splitting the panel 20 into parts 30, 40 for the different beams 32, 42.

Figure 11:
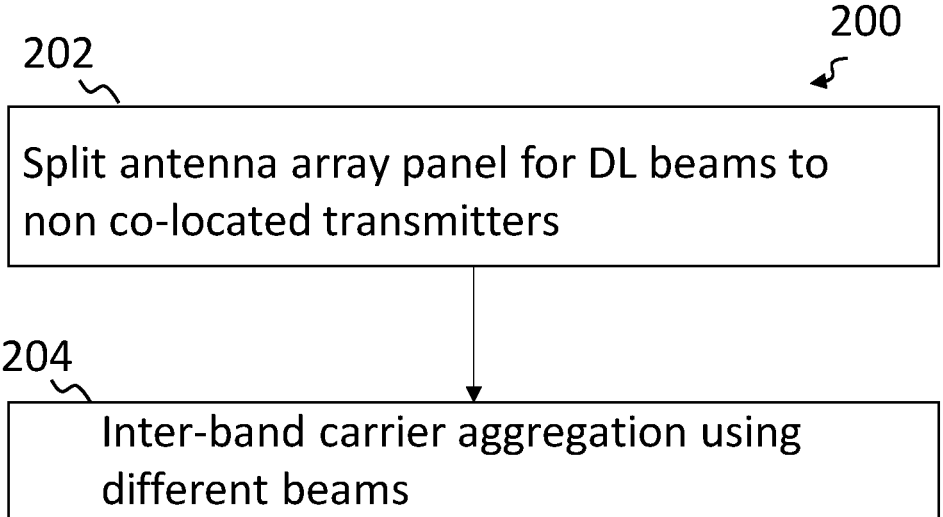
FIG. 11 shows another example of the subject matter described herein.

As illustrated in FIG. 11, the apparatus 10 is configured to perform the method 200. The method 200 comprises at block 202 splitting an antenna array panel 20, comprising an array 22 of antenna elements 24, to provide a first part 30 for a first downlink beam 32 from a first transmitter 60 and a second part 40 for a second downlink beam 42 from a second transmitter 62, wherein the first downlink beam 32 and the second downlink beam 42 have independent directions. The method 200 comprises at block 204, enabling inter-band carrier aggregation 80 at a receiver using a first component carrier 50 received at the first part 30 of the antenna array panel 20 via the first downlink beam 32 and a second component carrier 52 received at the second part 40 of the antenna array panel 20 via the second downlink beam 42.

In at least some examples, the independent directions are different directions.

The foregoing examples enable non-co-located inter-band carrier aggregation with independent beam management with less hardware costs because the apparatus 10 uses a common, single receiver 70 and a common, single antenna array panel 20.

This saves hardware compared to treating each spatial channel separately and having a different antenna array panel for each transmission point and a different receiver for each transmission point.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor and at least one memory storing instructions that, when executed by the at least one processor, cause the apparatus at least to:

split an antenna array panel, comprising an array of antenna elements, to provide at least a first part for a first downlink beam from a first transmitter and a second part for a second downlink beam from a second transmitter, wherein the first downlink beam and the second downlink beam have independent directions;

enable inter-band carrier aggregation at receiver circuitry using a first component carrier received at the first part of the antenna array panel via the first downlink beam and a second component carrier received at the second part of the antenna array panel via the second downlink beam; and dynamically adjust at least one of a first number of antenna elements in the first part of the antenna array panel or a second number of antenna elements in the second part of the antenna array panel, wherein the at least one of the first number of antenna elements or the second number of antenna elements are determined in dependence on measured pathloss.

2. An apparatus as claimed in claim 1, further configured to independently beam-steer the first downlink beam and the second downlink beam.

3. An apparatus as claimed in claim 1, further configured to determine the first number of antenna elements and the second number of antenna elements in dependence on measurements.

4. An apparatus as claimed in claim 1, wherein the apparatus is caused to dynamically adjust at least one of a first number of antenna elements or a second number of antenna elements by dynamically adjusting both the first number of antenna elements in the first part of the antenna array panel and the second number of antenna elements in the second part of the antenna array panel.

5. An apparatus as claimed in claim 1, further configured to determine the measured pathloss based on a beam measurement reference signal.

6. An apparatus as claimed in claim 1, wherein at least some antenna elements of the array are selectable to be in at least one of: the first part or the second part of the antenna array panel.

7. An apparatus as claimed in claim 1, wherein the receiver circuitry comprises common circuitry that is common for the first component carrier and the second component carrier, wherein the common circuitry comprises analog to digital conversion circuitry that is common for the first component carrier and the second component carrier.

8. An apparatus as claimed in claim 1, wherein the first component carrier occupies a first frequency band and the second component carrier occupies a second frequency band, different to the first frequency band, the apparatus comprising combination circuitry configured to:

down convert the first component carrier to a third frequency band; and down convert the second component carrier to a fourth frequency band;

and the receiver circuitry is configured to process the first component carrier occupying the third frequency band and the second component carrier occupying the fourth frequency band, wherein the receiver circuitry is configured to process the third and fourth frequency bands.

9. An apparatus as claimed in claim 8, wherein the combination circuitry is configured to perform at least of one of the following:

down convert the first component carrier to the third frequency band and separately down convert the second component carrier to the fourth frequency band, or simultaneously down convert the first component carrier to a first intermediate frequency band and the second component carrier to a second intermediate frequency band, and simultaneously down convert the first component carrier from the first intermediate frequency band to the third frequency band and the second component carrier from the second intermediate frequency band to the fourth frequency band.

10. An apparatus as claimed in claim 8, wherein the third frequency band and the fourth frequency band are contiguous.

11. An apparatus comprising:

at least one processor and at least one memory storing instructions that, when executed by the at least one processor, cause the apparatus at least to:

split an antenna array panel, comprising an array of antenna elements, to provide at least a first part for a first downlink beam from a first transmitter and a second part for a second downlink beam from a second transmitter, wherein the first downlink beam and the second downlink beam have independent directions;

enable inter-band carrier aggregation at receiver circuitry using a first component carrier received at the first part of the antenna array panel via the first downlink beam and a second component carrier received at the second part of the antenna array panel via the second downlink beam;

operate in the first part and provide a first physical downlink path to the receiver circuitry for an antenna element; and operate in the second part and provide a second physical downlink path to the receiver circuitry for the antenna element, wherein the first physical path and the second physical path comprise differences.

12. An apparatus as claimed in claim 11, wherein the first physical downlink path and the second physical downlink path are frequency selective, the first physical downlink path being configured for the first frequency band but not the second frequency band and the second physical downlink path being configured for the second frequency band but not the first frequency band.

13. An apparatus as claimed in claim 11, comprising a switching arrangement configured to switch between the first physical downlink path and the second physical downlink path.

14. An apparatus as claimed in claim 13, wherein at least one antenna element has a single feed and the switching arrangement is configured to couple the feed to the receiver circuitry via a selected one of the first physical downlink path and the second physical downlink path.

15. An apparatus as claimed in claim 13, wherein at least one antenna element has a dual feed and the switching arrangement is configured to couple a selected one of the dual feeds to the receiver circuitry.

16. An apparatus as claimed in claim 1, further configured to switch between using the antenna array panel in a split configuration comprising the first part for a first beam direction and the second part for a second beam direction and an unsplit configuration for a single beam direction.

17. An apparatus as claimed in claim 1, further configured to control:

the first frequency band of the first component carrier;

the number of antenna elements in the first part;

the first direction of the first downlink beam at reception the second frequency band of the second component carrier;

the number of antenna elements in the second part; and the second direction of the first downlink beam.

18. User equipment configured as the apparatus of claim 1.

19. A method comprising:

splitting an antenna array panel, comprising an array of antenna elements, to provide a first part for a first downlink beam from a first transmitter and a second part for a second downlink beam from a second transmitter, wherein the first downlink beam and the second downlink beam have independent directions;

enabling inter-band carrier aggregation at a receiver using a first component carrier received at the first part of the antenna array panel via the first downlink beam and a second component carrier received at the second part of the antenna array panel via the second downlink beam; and dynamically adjusting at least one of a first number of antenna elements in the first part of the antenna array panel or a second number of antenna elements in the second part of the antenna array panel, wherein at least one of the first number of antenna elements or the second number of antenna elements are determined in dependence on measured pathloss.

20. An apparatus as claimed in claim 1, wherein the instructions, when executed by the at least one processor, further cause the apparatus to:

responsive to the measured pathloss indicating an increase in pathloss, determine an increased number of the first number of antenna elements or the second number of antenna elements, and responsive to the measured pathloss indicating a decrease in pathloss, determine a decreased number of the first number of antenna elements or the second number of antenna elements.

* * * * *